United States Patent
Byren et al.

(10) Patent No.: US 6,690,696 B2
(45) Date of Patent: Feb. 10, 2004

(54) LASER COOLING APPARATUS AND METHOD

(75) Inventors: Robert W. Byren, Manhattan Beach, CA (US); William S. Griffin, Manhattan Beach, CA (US); Alexander A. Betin, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/171,955

(22) Filed: Jun. 14, 2002

(65) Prior Publication Data

US 2003/0231667 A1 Dec. 18, 2003

(51) Int. Cl.⁷ .................................................. H01S 3/04
(52) U.S. Cl. ........................................ 372/35; 372/34
(58) Field of Search ............................. 372/34, 35, 36, 372/48

(56) References Cited

U.S. PATENT DOCUMENTS

| | | | | |
|---|---|---|---|---|
| 3,992,684 A | * | 11/1976 | Patrick et al. ................. 372/54 |
| 5,073,831 A | * | 12/1991 | Flint .......................... 359/845 |
| 5,105,430 A | * | 4/1992 | Mundinger et al. ............ 372/35 |
| 5,239,551 A | * | 8/1993 | Roberts et al. ................ 372/57 |
| 5,278,860 A | * | 1/1994 | August et al. ................. 372/70 |
| 5,299,213 A | * | 3/1994 | Kuba et al. ................... 372/35 |
| 5,327,444 A | * | 7/1994 | Mooradian ................... 372/44 |
| 5,351,251 A | * | 9/1994 | Hodgson ........................ 372/4 |
| 5,471,491 A | * | 11/1995 | Phillips et al. ................. 372/35 |
| 5,636,239 A | * | 6/1997 | Bruesselbach et al. ........ 372/70 |
| 5,659,567 A | * | 8/1997 | Roberts et al. ............... 372/82 |
| 5,790,575 A | * | 8/1998 | Zamel et al. .................. 372/35 |
| 5,974,061 A |   | 10/1999 | Byren et al. |
| 6,014,391 A |   | 1/2000 | Byren |
| 6,026,109 A | * | 2/2000 | Micke et al. .................. 372/92 |
| 6,052,396 A | * | 4/2000 | Zamel et al. .................. 372/34 |
| 6,055,260 A |   | 4/2000 | Byren et al. |
| 6,222,864 B1 | * | 4/2001 | Waarts et al. .................. 372/43 |
| 6,301,277 B1 | * | 10/2001 | Tinti et al. ..................... 372/35 |
| 6,339,605 B1 | * | 1/2002 | Vetrovec ....................... 372/35 |

\* cited by examiner

*Primary Examiner*—Paul Ip
*Assistant Examiner*—Phillip Nguyen
(74) *Attorney, Agent, or Firm*—John E. Gunther; Glenn H. Lenzen, Jr.

(57) ABSTRACT

A laser cooling apparatus and method. Generally, the inventive apparatus includes a mechanism for transporting sensible thermal energy from a solid state laser and for communicating waste fluorescent radiation therefrom as well. In the illustrative embodiment, the apparatus includes an optically transparent manifold with an inlet port, an exhaust port and a plurality of spray nozzles therebetween adapted to direct a cooling fluid on the laser medium of a laser. In addition, the optically transparent manifold is used to permit waste fluorescent radiation to escape the confines of the laser and cooling system means such that said fluorescent radiation may be optically directed to an external heat sink such as free space.

10 Claims, 6 Drawing Sheets

LASER COOLING APPARATUS AND METHOD

BACKGROUND OF THE INVENTION

1. Field of the Invention

The present invention relates to lasers. More specifically, the present invention relates to systems and methods for cooling solid-state laser media.

2. Description of the Related Art

As is well-known in the art, lasers emit waste energy in two forms: 1) sensible heat and 2) fluorescence. Sensible, heat is energy that is conducted through the surface while fluorescence is waste light that is created within the medium. Sensible heat is produced by non-radiative processes in the laser medium that enable relaxation of the excited species, which may be rare-earth ions in a crystal, from a higher energy level to a lower energy level. An unavoidable portion of the sensible heat is due to the "quantum defect" which is the difference in photon energy between the pump light and the laser light. Other processes may contribute to the sensible heat, including photon-assisted quenching of the upper state population by intermediate energy levels, upconversion and subsequent non-radiative relaxation, and ground-state absorption. Fluorescent light is an omni-directional spontaneous emission resulting from incomplete extraction by the laser beam of the energy stored in a population inversion. Fluorescent light does not create heat until it impinges upon a surface and is absorbed.

Waste energy is particularly problematic with respect to solid-state lasers. That is, chemical lasers, gas lasers, and liquid medium lasers, such as dyes, have a lasing medium which may be caused to flow out of the active region of the laser cavity for cooling. Solid-state lasers, on the other hand, typically have a stationary lasing medium, which does not allow heat removal by forced convection of the lasing medium. That is, once the medium is heated with pump energy, it cannot simply be removed from the pump cavity for cooling. Unfortunately, failure to successfully remove heat from solid-state lasers will cause the temperature of the medium to substantially increase, and may degrade the operation of the laser and reduce its reliability.

For slab laser media that are cooled across the broad face of the slab, the sensible heat may be transported through the thin dimension to the slab's surfaces by conduction without incurring excessive temperature drops. The radiant energy of spontaneous emission, however, must also be rejected. In some solid-state lasers, such as ytterbium-doped yttrium aluminum garnet (Yb:YAG), the energy of the fluorescent radiation component may exceed that of the sensible heat component by a factor of four.

Accordingly, U.S. patent application Ser. No. 10/202,752, filed Jul. 25, 2002, by A. Betin and W. Griffin and entitled MULTI-JET IMPINGEMENT COOLED LASER PUMPHEAD AND METHOD (Attorney Docket No. PD-01W090), the teachings of which are incorporated herein by reference, discloses and claims an invention which uses liquid-phase multi-jet impingement directly on the broad face of a slab to remove the sensible heat component and either uses an absorbing species in the cooling liquid or an absorbing structure immersed within the cooling manifold to absorb the fluorescent component in a distributed volume at some distance away from the slab face, such that the fluorescent heating does not add to the sensible heat at the slab face. This approach provides excellent thermal transfer at the surface, avoids problems associated with nucleate boiling in a 2-phase cooling system and is compatible with a continuously operating high power laser system.

However this approach also relies on the slab pumphead cooling loop to remove both the sensible and fluorescence components. This places an additional thermal load on the coolant and the associated heat transfer equipment which rejects heat from the coolant, requiring high flow rates and large diameter cooling lines in an already congested volume. This may increase the requirements on the external heat dissipator by a factor of five. For a spaceborne application which rejects heat by radiation to ambient, this increase may become critical.

Thus, there is a need in the art for an improved, inexpensive, lightweight system or method for removing waste energy from lasers, particularly solid-state lasers, without converting the fluorescent component of the waste energy to heat.

SUMMARY OF THE INVENTION

The need in the art is addressed by the laser cooling apparatus and method of the present invention. Generally, the inventive apparatus includes a mechanism for transporting thermal energy from a laser and for communicating fluorescent radiation therefrom as well.

In the illustrative embodiment, the apparatus includes an optically transparent cooling structure or manifold with an inlet port, an exhaust port and a plurality of spray nozzles therebetween adapted to direct a cooling fluid on the active medium of a solid-state laser. In the best mode, the manifold is constructed of sapphire, notwithstanding the fact that diamond and other optically transparent materials may be used, such that the fluorescent component of waste energy is transmitted as light out of and away from the laser pump cavity (or pumphead).

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
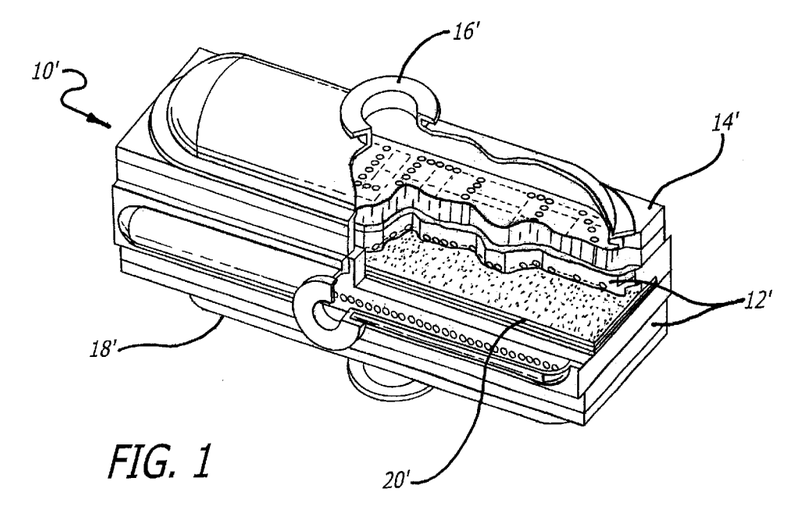
FIG. 1 is a cut-away 3-D solid model view of a multi-jet impingement-cooled slab laser pumphead designed in accordance with the teachings of the above-referenced Betin et al. application, which have been incorporated herein by reference.

FIG. 1 is a cut-away 3-D solid model view of a multi-jet impingement-cooled slab laser pumphead designed in accordance with the teachings of the above-referenced Betin et al. application, which have been incorporated herein by reference. As discussed more fully in the Betin et al. application, the pumphead 10' includes a diffusion-bonded rectangular slab laser medium 20' onto which a cooling fluid is sprayed by two symmetrically disposed multi-jet sprayheads 12'. The laser pumphead apparatus consists of an array of jets impinging on the surface of the laser slab with an interspersed array of exhaust holes. The diffusion-bonded laser slab is shown more clearly in FIG. 2.

Figure 2:
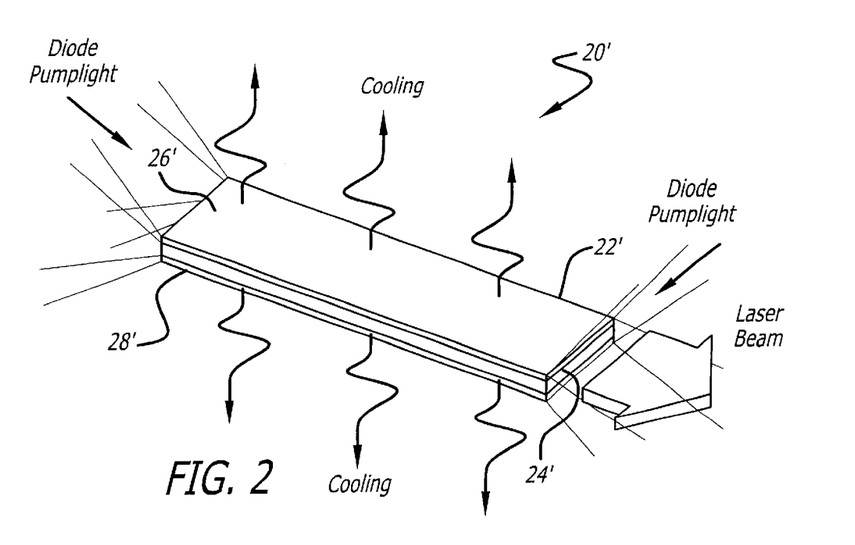
FIG. 2 is a simplified representation of the slab active lasing medium, showing conventional lasing, pumping, and cooling directions thereof.

FIG. 2 is a simplified representation of a slab laser medium, showing conventional lasing, pumping, and cooling directions thereof. Diode pump light is input along one or both ends 24' of the slab 20'. In the preferred embodiment, the slab is symmetrically pumped from both ends as illustrated in FIG. 2. When lasing action is initiated within the gain medium, a laser beam is emitted from the ends 24' of the slab 20'.

In accordance with the teachings of Betin et al., the slab 20' is cooled by a removal of thermal energy from the top and bottom surfaces 26' and 28' thereof through the spray of the coolant from a plurality of jets in the multi-jet sprayhead 12' of FIG. 1. The multi-jet sprayheads 12' may be disposed within an interface or metering plate 14'. Coolant is supplied through an intake manifold 16' and removed through an exhaust manifold 18'. Side exhaust of the coolant may be employed.

This general method of surface cooling is well known and is presently used extensively in the heat treating and tempered glass industries. In accordance with one embodiment of Betin's invention, the fluorescence component of waste power from the slab is absorbed within a species dissolved or suspended within the coolant media allowing the conversion from light to heat to occur in a distributed region within the coolant manifold and away from the surface of the slab. In another embodiment, the fluorescence is absorbed at the surface of a porous structure such as a screen mesh or stack of perforated plates disposed within the coolant manifold, such that the exhaust coolant flows through the mesh, thereby removing the waste power as sensible heat.

However, as mentioned above, this approach relies on the slab pumphead cooling loop to remove both the sensible and fluorescence components. This places an additional thermal load on the coolant and the associated heat transfer equipment which rejects heat from the coolant, requiring high flow rates and large diameter cooling lines in an already congested volume. This may increase the requirements on the external heat dissipator by a factor of five. For a spaceborne application which rejects heat by radiation to ambient at about 300° K, this increase may become critical.

Accordingly, a need has existed in the art for an improved, inexpensive, lightweight system or method for removing waste energy from lasers, particularly solid-state lasers, without converting the waste energy to heat.

The need in the art is addressed by the laser cooling apparatus and method of the present invention. The present invention uses essentially the same approach for removing the sensible heat from the surface of the slab via all-liquid phase multi-jet impingement cooling. However, the inventive apparatus further includes a mechanism—an optically transparent manifold—for communicating fluorescent radiation from the slab as well.

Figure 3:
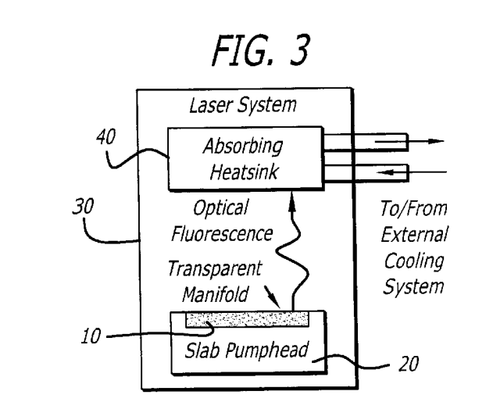
FIG. 3 is a simplified diagram showing an illustrative application of the teachings of the present invention.

FIG. 3 is a simplified diagram showing an illustrative application of the teachings of the present invention. As shown in FIG. 3, in accordance with the present teachings, the optically transparent manifold 10 is applied around a slab pumphead 20 to remove sensible heat and transmit fluorescent energy therefrom. In the illustrative embodiment, as discussed more fully below, the optically transparent manifold 10 includes an inlet port, an exhaust port and a plurality of spray nozzles therebetween (none of which are shown in FIG. 3) adapted to direct a cooling fluid on the active medium of a laser. The manifold 10 is coupled to a conventional cooling loop (not shown) to remove sensible heat from the slab pumphead 20 using a multi-jet impingement approach, such as that shown in disclosed in the above-referenced Betin et al. application.

The transparency of the manifold 10 allows for the fluorescent energy to be more efficiently removed from the system than heretofore possible using conventional teachings. The manifold 10 is made from a material that is transparent at the fluorescence wavelength of the laser (e.g., 1.03 $\mu$m for Yb:YAG) thereby allowing the fluorescence component of waste power to pass through a coolant and manifold structure in the form of optical radiation, where it can be removed without adding to the heat load of the laser cooling system. (In a preferred mode, the manifold is constructed of sapphire notwithstanding the fact that diamond and other optically transparent materials may be used.)

FIGS. 3–7 depict various arrangements for removing fluorescent energy communicated through the transparent manifold of the present invention. FIG. 3 depicts a first embodiment by which the fluorescent energy is absorbed by a separate heat sink 40 within a laser system 30. Those skilled in the art will appreciate that the use of a separate heat sink 40 allows for the thermal load associated with the fluorescent energy to be handled more easily, where the heat sink temperature is not constrained by the performance of the laser medium.

Figure 4:
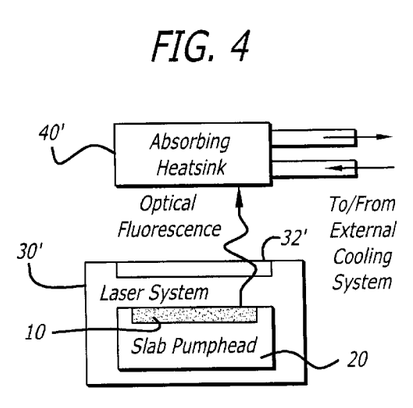
FIG. 4 shows an alternative arrangement by which the florescent radiation may be transmitted through an optically transparent window out of the laser system to an external absorptive heat sink structure such as the inside of the aircraft skin or a jet fuel heat exchanger.

FIG. 4 shows an alternative arrangement by which the florescent radiation may be transmitted through an optically transparent window 32' out of the laser system 30' to an external absorptive heat sink structure 40' such as the inside of the aircraft skin or a jet fuel heat exchanger.

Figure 5:
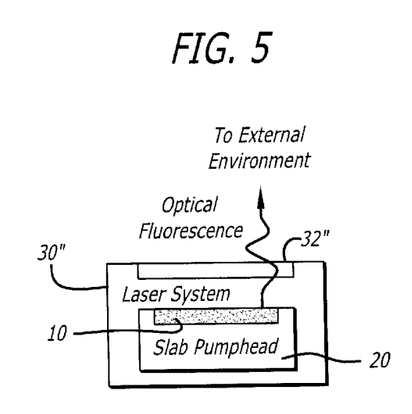
FIG. 5 shows yet another alternative arrangement in which the florescent radiation is relayed and transmitted out of the host platform to the external environment.

FIG. 5 shows yet another alternative arrangement in which the florescent radiation is relayed and transmitted out of the host platform 30" to the external environment. This approach is attractive for space based laser systems since it avoids the processes of first converting the fluorescence power to sensible heat, transporting the heat via heat pipes or other means to a thermal radiator panel, and finally converting the waste power back into light as infrared blackbody radiation at the radiator panel.

Figure 6:
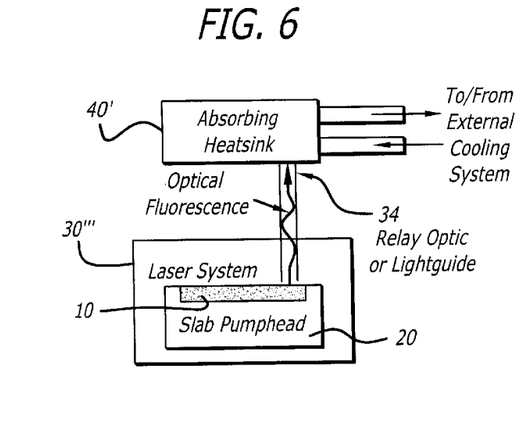
FIGS. 6 and 7 depict additional alternative arrangements by which the fluorescent energy is transported to either an absorbing heat sink (FIG. 6) or to the external environment (FIG. 7) by a relay optic or light guide (optical fibers or light pipes).
Figure 7:
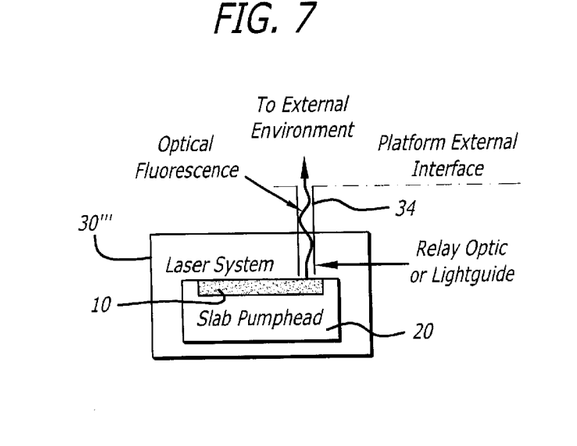

FIGS. 6 and 7 depict additional alternative arrangements by which the fluorescent energy is transported to either an external absorbing heat sink (FIG. 6) or to an external environment (FIG. 7) by a relay optic or light guide (optical fibers or light pipes) 34. In these figures, next to the manifold 10, the adjacent fibers may be sintered to each other, their previously round cross-section assuming a hexagonal or other polygonal form. The space left between the fibers should be minimized to limit the fluorescent energy from escaping and landing in an undesired location. The remaining lengths of the fibers can be bundled together and routed, in a manner similar to electrical cabling, to a convenient point at which the fluorescent light in the fibers can escape and be dissipated in an external absorber or environment. One or more mirrors or refractive elements (with or without optical power) may also be positioned outside the top and bottom surfaces of the manifold so that the fluorescent light emanating from the manifold may be directed to a desired location.

Figure 8:
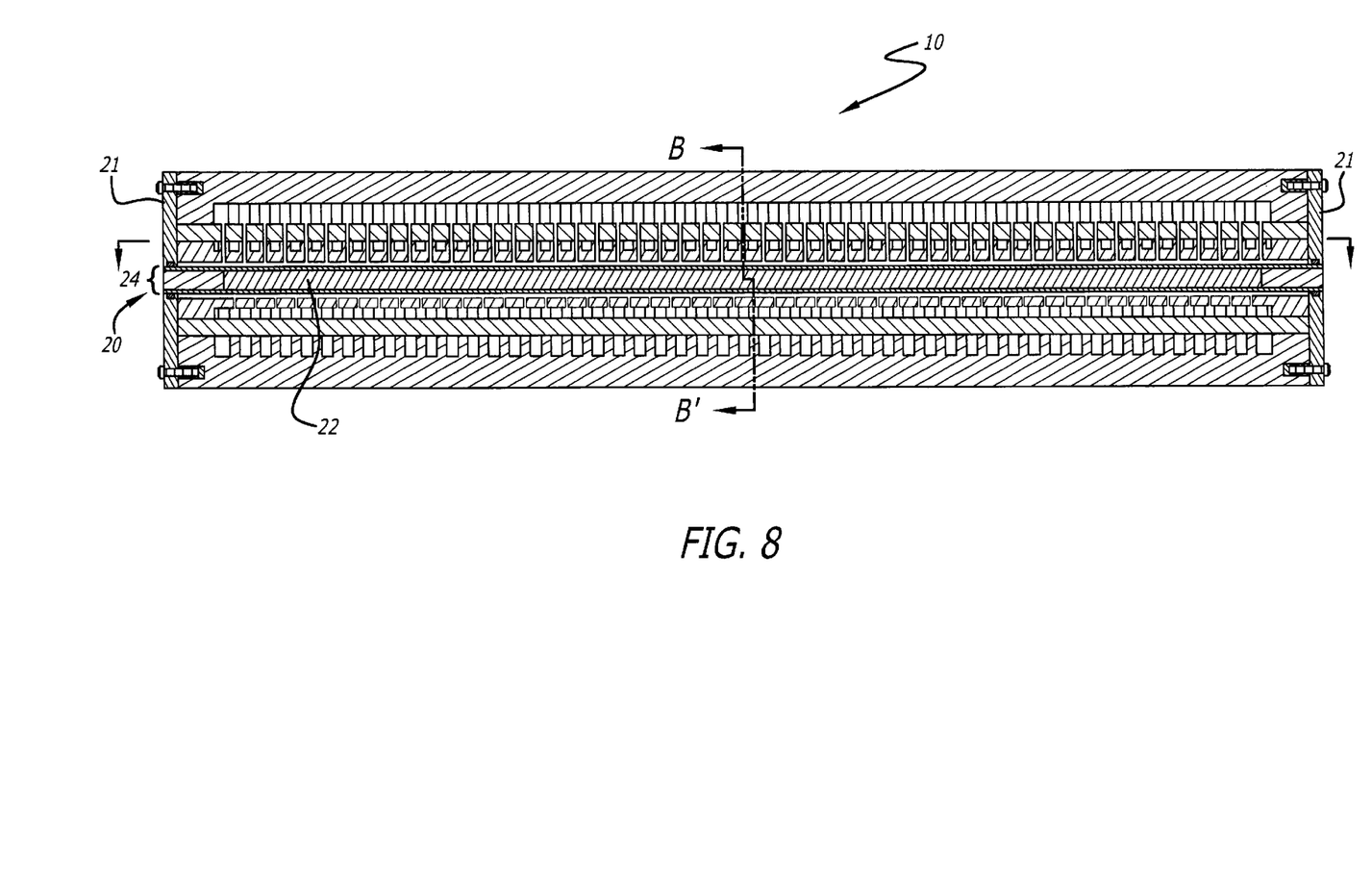
FIG. 8 is a sectional side view of a transparent manifold implemented in accordance with the teachings of the present invention.

FIG. 8 is a sectional side view of a transparent manifold implemented in accordance with the teachings of the present invention.

Figure 9:
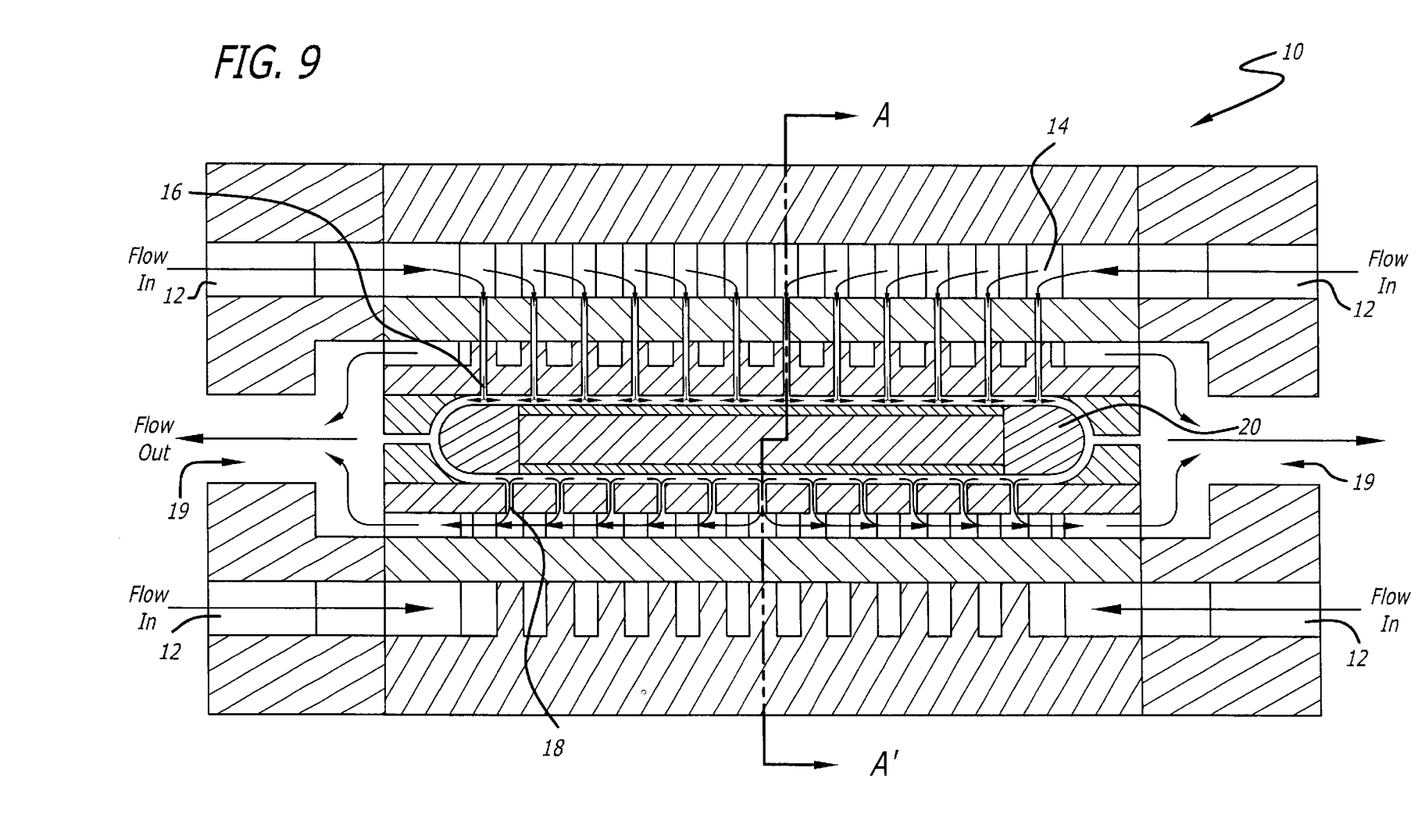
FIG. 9 is a sectional in view of the manifold of FIG. 8 taken along the lines B–B' thereof.

FIG. 9 is a sectional end view of the manifold of FIG. 8 taken along the lines B–B' thereof.

Figure 10:
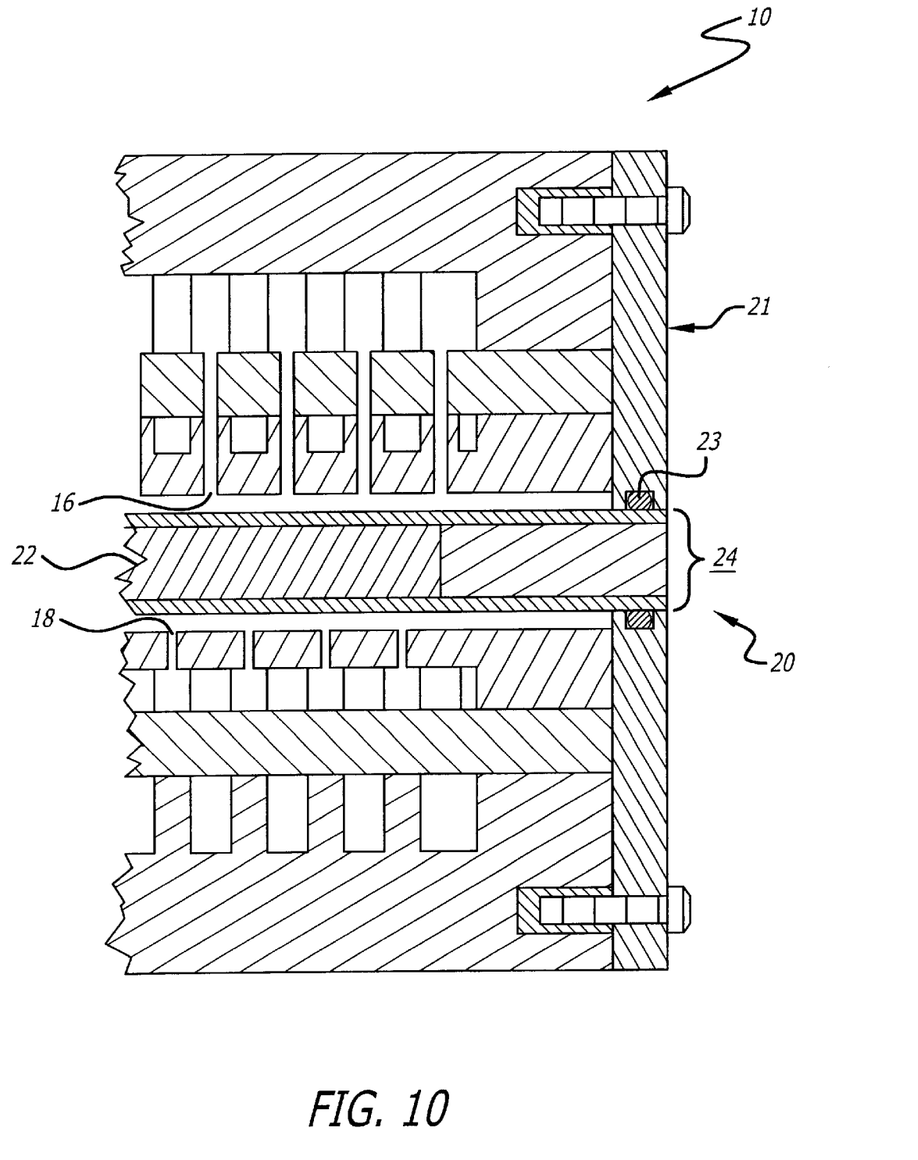
FIG. 10 is a magnified sectional side view of the transparent manifold of FIG. 9 taken along the lines A–A' thereof.

FIG. 10 is a magnified sectional side view of a portion of the transparent manifold of FIG. 9 taken along the lines A–A' thereof.

The design requirements of the transparent manifold are different from those described for the manifold of the above-referenced application Betin et al. due to the fact that high intensity light will be passing through the flow manifold. Flow areas and nozzle sizes remain the same however inasmuch as, as described earlier, these design elements depend primarily on the sensible heat dissipated at the external surfaces of the slab. The flow manifold may be fabricated as a monolithic structure with no o-ring seals or gaskets to absorb or scatter the fluorescence radiation. In the illustrative embodiment, the manifold 10 is constructed with sections of sapphire which are machined to provide inlets, outlets and channels therein. Joining of the various layers may be accomplished by optical bonding techniques, such as chemical bonding, optical contacting, or preferably diffusion bonding. Diffusion bonding of large areas of glass and/or sapphire is now well-established and produces strong and optically-clear interfaces. One practitioner of this art is Onyx Optics, Dublin, Calif. who holds several fundamental patents in the field.

The design should avoid sharp edges, sites from which cracks could propagate, and high aspect ratio nozzle configurations, which could break off in handling and under normal vibration/shock loads. Nozzle sizes, center-to-center spacing, and placement as well as approximate cross-sections of flow manifolds will be selected in accordance with the teachings of the above referenced Betin et al. application. This is due to the fact that removal of sensible heat from the slab's surface dominates the multi-jet cooling flow, and is only weakly dependent on heat dissipated by the fluorescent energy in the cooling fluid.

In FIGS. 8–10, the active core of the slab 20 is shown at 22. A cladding 24 surrounds the core 22. As is common in the art, the cladding 24 allows guiding of the pump and laser light within the core, protects the core 22 from breakage and conducts heat therefrom. The flow of coolant around the slab 20 is illustrated in FIG. 9. Any conventional coolant may be used such as water, alcohol, ammonia, cryogens (for space applications), mixtures thereof or any other coolant fluid known in the art with suitable thermal capacity and operative at the temperature extremes of the system. Further, those skilled in art will appreciate that a gas may be used as the cooling fluid without departing from the scope of the present teachings.

As shown in FIGS. 9 and 10, coolant flows into one of four inlets 12 through channels 14 to nozzles 16 where it is sprayed on the slab 20. The exhaust fluid is received by exhaust channels 18 and exits via exhaust ports 19. Reflective metal end plates 21, within which O-ring seals 23 are seated, ensure sealing of the coolant within the manifold 10 and slab 20.

Figure 11A:
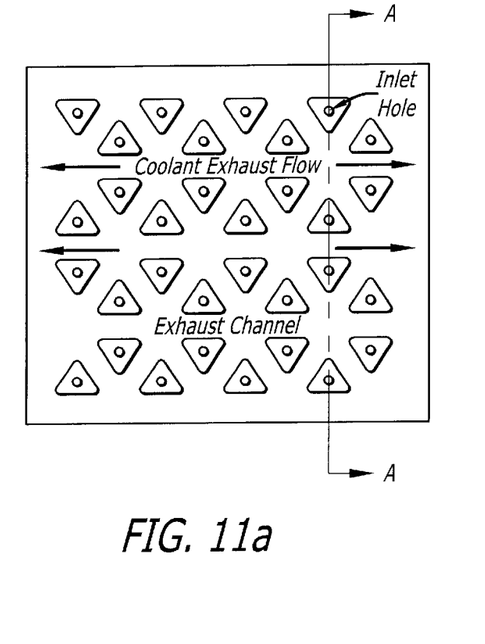
FIG. 11a shows a top view of a monolithic manifold with no exhaust holes.
Figure 11B:
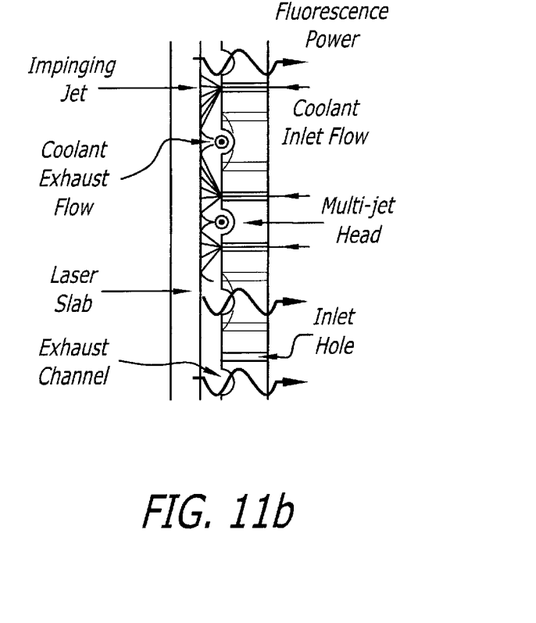
FIG. 11b is a sectional side view of the manifold of FIG. 11a taken along the line A—A thereof.
Figure 12:
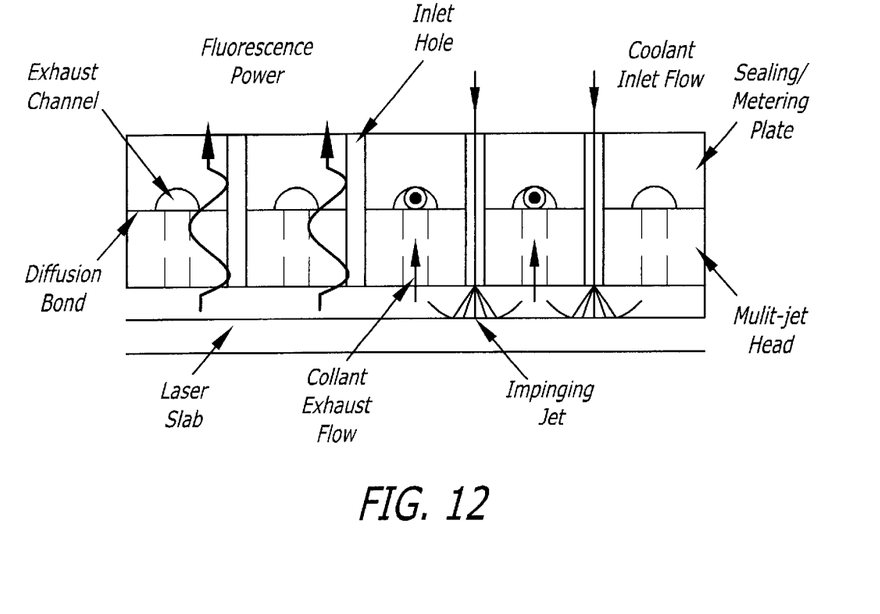
FIG. 12 shows an alternative embodiment for the diffusion-bonded manifold in which the bonded surfaces form a series of parallel exhaust ports.

Alternative embodiments for the optically clear manifold are shown in FIGS. 11 and 12. FIG. 11a shows a top view of a monolithic manifold with no exhaust holes. FIG. 11b is a sectional side view of the manifold of FIG. 11a taken along the line A—A thereof. In this configuration, the coolant liquid, after impinging on the laser slab, is exhausted transversely, preferentially through a series of interconnecting, recessed flow channels machined in the surface of the sapphire. The channels form a two-dimensional network with hexagonal symmetry and the jet nozzles are drilled in the mesas left after cutting the channels. All inside and outside corners are rounded to avoid crack initiation and propagation under load. The entire plate structure is clamped and sealed around the edges with a face-seal o-ring to the high-pressure inlet manifold cover.

FIG. 12 shows an alternative embodiment for the diffusion-bonded manifold in which the bonded surfaces form a series of parallel exhaust ports. The exhaust ports are accessed through exhaust holes drilled through the multi-jet layer. This configuration is more complex than that shown in FIG. 11, but provides better control of the exhaust flow with better temperature uniformity across the laser slab's surface.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An apparatus for use in a cooling system comprising:
   first means for transporting thermal energy from a source;
   second means for communicating electro-optical radiation from said first means,
   said second means being a manifold constructed of a material substantially transparent to said electro-optical radiation; and said second means includes means for directing a cooling fluid over a surface of said source.

2. The invention of claim 1 wherein said means for directing a cooling fluid over the surface of said source includes a plurality of conduits in said manifold.

3. The invention of claim 2 wherein said means for directing a cooling fluid over the surface of said source further includes an inlet in said manifold and an exhaust port in said manifold.

4. The invention of claim 1 wherein said material is transparent to the waste electromagnetic energy generated by said source.

5. The invention of claim 4 wherein said waste electromagnetic energy is waste fluorescent radiation energy at a wavelength consistent with operation of a laser system with which said apparatus is used.

6. The invention of claim 5 wherein said source is a slab of a solid-state laser.

7. A cooling system adapted for use with a laser, said cooling system comprising:

means for providing a cooling fluid and a manifold constructed of a material transparent to fluorescent energy radiating from said laser and mounted in close physical proximity to the laser medium thereof, said manifold including an inlet, a plurality of nozzles, in communication with said inlet, for spraying said fluid on said laser medium and an exhaust port for retrieving said fluid after said fluid is sprayed on said laser medium.

8. The system of claim 7 further including means for depositing significant portions of said fluorescent energy in either the cooling fluid or said manifold.

9. The system of claim 7 including means for optically directing said fluorescent energy to an external environment without intermediate cooling means.

10. A method for cooling a laser medium of a laser system including the steps of:

providing a cooling fluid;

spraying said cooling fluid on said medium to remove thermal energy therefrom; and optically removing fluorescent energy from said laser medium via a substantially transparent manifold without depositing said fluorescent energy in said cooling fluid.

* * * * *